(12) United States Patent
Morita

(10) Patent No.: US 10,552,146 B2
(45) Date of Patent: Feb. 4, 2020

(54) INFORMATION PROCESSING APPARATUS THAT EXECUTES UPDATE APPLICATION, CONTROL METHOD THEREFOR, AND STORAGE MEDIUM

(71) Applicant: CANON KABUSHIKI KAISHA, Tokyo (JP)

(72) Inventor: Naoki Morita, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/584,307

(22) Filed: May 2, 2017

(65) Prior Publication Data
US 2017/0329601 A1 Nov. 16, 2017

(30) Foreign Application Priority Data

May 11, 2016 (JP) .................................. 2016-095439

(51) Int. Cl.
G06F 9/44 (2018.01)
G06F 8/658 (2018.01)
G06F 3/12 (2006.01)
G06F 9/4401 (2018.01)

(52) U.S. Cl.
CPC ............ *G06F 8/658* (2018.02); *G06F 3/1203* (2013.01); *G06F 3/123* (2013.01); *G06F 3/1293* (2013.01); *G06F 9/4411* (2013.01); *G06F 3/1225* (2013.01)

(58) Field of Classification Search
CPC .................................................. G06F 8/65–71
USPC ................................................ 717/168–178
See application file for complete search history.

(56) References Cited

U.S. PATENT DOCUMENTS

| 7,408,662 | B2* | 8/2008 | Sakura | G06F 8/65 358/1.15 |
| 7,921,421 | B2* | 4/2011 | Kawaguchi | G06F 9/4411 717/170 |
| 8,271,967 | B2* | 9/2012 | Wu | G06F 8/65 717/168 |
| 8,345,297 | B2* | 1/2013 | Kawabuchi | G06F 8/65 358/1.16 |
| 8,438,556 | B2 | 5/2013 | Abe | |

(Continued)

FOREIGN PATENT DOCUMENTS

JP 2007011793 A 1/2007

*Primary Examiner* — Francisco J Aponte
(74) *Attorney, Agent, or Firm* — Rossi, Kimms & McDowell LLP

(57) ABSTRACT

An information processing apparatus has a printer driver module and a USB port and executes an update application that firmware of an MFP that carries out communications via the USB port and firmware of an MFP that is capable of carrying out communications with the device driver. When the printer driver module is a printer driver module that manages connection information indicating that the printer driver module and the USB port are connected together, an MFP having firmware to fee updated is determined as an update candidate based on first information indicating the MFP capable of carrying out communications with the printer driver module and second information indicating the MFP connected to the USB port. When the printer driver module is a device driver module that does not manage the connection information, the update candidate is selected using the first information without using the second information.

17 Claims, 13 Drawing Sheets

(56) References Cited

U.S. PATENT DOCUMENTS

| | | | |
|---|---|---|---|
| 9,692,928 B2* | 6/2017 | Oguma | G06F 8/654 |
| 9,965,231 B2* | 5/2018 | Li | G06F 3/1228 |
| 2002/0067504 A1* | 6/2002 | Salgado | G06F 9/4411 |
| | | | 358/1.15 |
| 2004/0223182 A1* | 11/2004 | Minagawa | G06F 3/1203 |
| | | | 358/1.15 |
| 2006/0061789 A1* | 3/2006 | Yamaoka | G06F 8/65 |
| | | | 358/1.13 |
| 2006/0077945 A1* | 4/2006 | Kethireddy | H04L 41/12 |
| | | | 370/346 |
| 2007/0006150 A9* | 1/2007 | Walmsley | B41J 2/04505 |
| | | | 717/120 |
| 2008/0127159 A1* | 5/2008 | Regenmorter | G06F 8/65 |
| | | | 717/168 |
| 2008/0263538 A1* | 10/2008 | Bando | G06F 8/65 |
| | | | 717/171 |
| 2008/0263540 A1* | 10/2008 | Bando | G06F 8/658 |
| | | | 717/173 |
| 2009/0320016 A1* | 12/2009 | Takatani | G06F 8/65 |
| | | | 717/171 |
| 2011/0066960 A1* | 3/2011 | Suzuki | G06F 8/65 |
| | | | 715/764 |
| 2012/0044534 A1* | 2/2012 | Ichikawa | G06F 3/1204 |
| | | | 358/1.15 |
| 2013/0321839 A1* | 12/2013 | Sekiguchi | G06F 3/1225 |
| | | | 358/1.13 |
| 2014/0149976 A1* | 5/2014 | Yagiura | G06F 8/65 |
| | | | 717/173 |
| 2014/0282490 A1* | 9/2014 | Shinomiya | G06F 8/61 |
| | | | 717/174 |

* cited by examiner

INFORMATION PROCESSING APPARATUS THAT EXECUTES UPDATE APPLICATION, CONTROL METHOD THEREFOR, AND STORAGE MEDIUM

BACKGROUND OF THE INVENTION

Field of the Invention

The present invention relates to an information processing apparatus, a control method therefor, and a storage medium, and in particular to an information processing apparatus that executes an update application to update firmware of an image processing apparatus, a control method therefor, and a storage medium.

Description of the Related Art

A Version 3 printer driver module (hereafter referred to merely as a "V3 driver") compliant with a conventional OS (operating system) is used as a printer driver module. In the V3 driver, a language monitor module provided in the V3 driver controls data communications between a PC and an MFP connected to a USB port. In recent years, a Version 4 printer driver module (hereafter referred to merely as a "V4 driver") has been developed as a printer driver module compliant with Windows 8 and the subsequent OSs, and update from the V3 driver to the V4 driver is being contemplated.

The V4 driver, however, has no language monitor module, and hence data communications between a PC and an MFP, which would be carried out by a language monitor module, cannot be implemented merely with update from the V3 driver to the V4 driver.

SUMMARY OF THE INVENTION

The present invention provides an information processing apparatus that has a device driver and a local communication port, and executes an update application that updates firmware of an image processing apparatus configured to carry out communications via the local communication port, and firmware of an image processing apparatus capable of carrying out communications with the device driver, comprising a first obtaining unit configured to obtain first information indicating the image processing apparatus capable of carrying out communications with the device driver, a second obtaining unit configured to obtain second information indicating the image processing apparatus connected to the local communication port, and a determination unit configured to, when the device driver is a device driver that manages connection information indicating that the device driver and the local communication port are connected together, determine an image forming apparatus having firmware to be updated as an update candidate based on the first information and the second information, wherein the determination unit determines the update candidate using the first information without using the second information when the device driver is a device driver that does not manage the connection information.

Further features of the present invention will become apparent from the following description of exemplary embodiments (with reference to the attached drawings).

DESCRIPTION OF THE EMBODIMENTS

Figure 1:
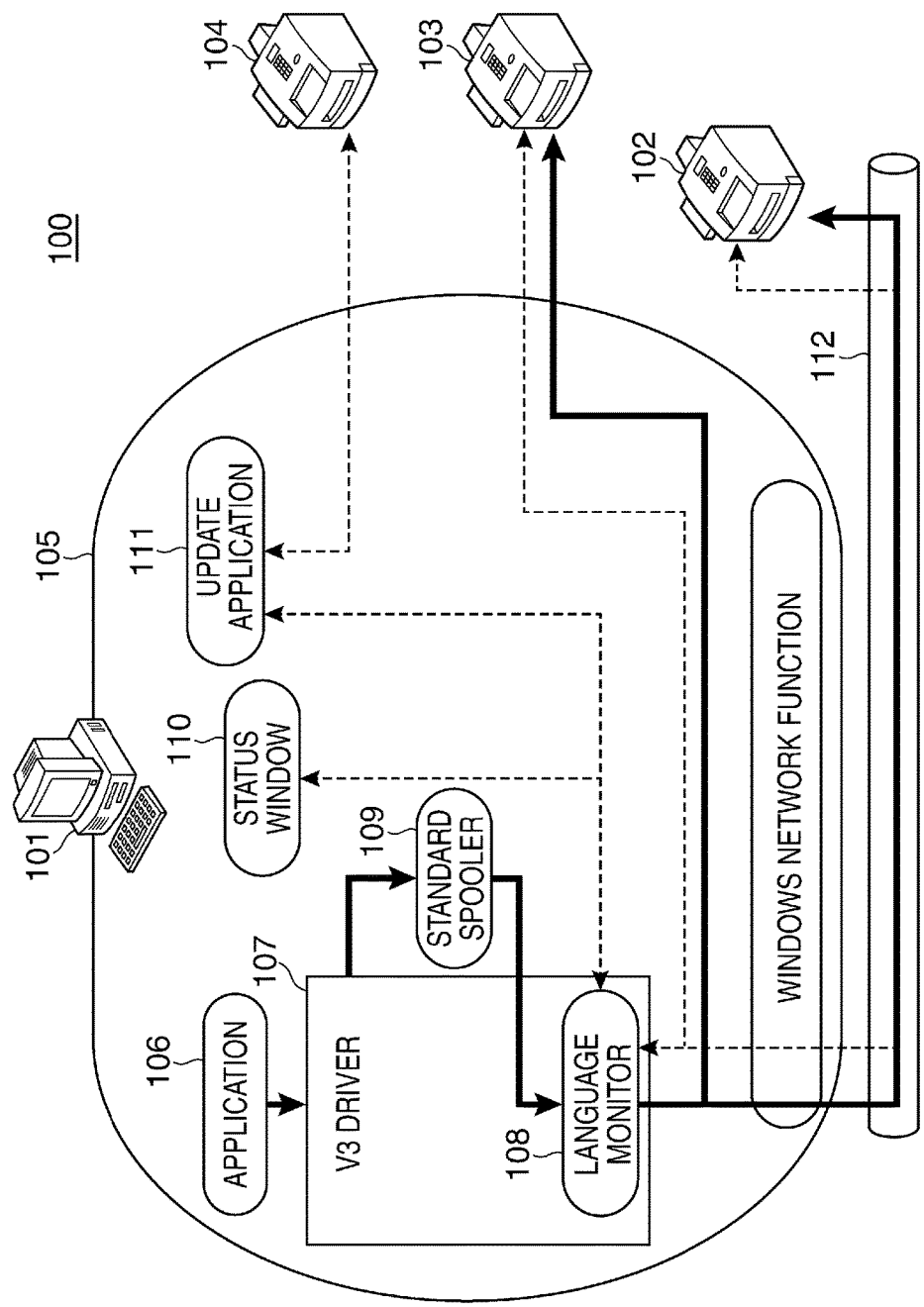
FIG. 1 is a diagram schematically showing an arrangement of a communication system including a PC that is an information processing apparatus according to an embodiment of the present invention in which an update application module is installed.

First, a description will be given of an underlying technique as a comparative example. As described above, there is known an update application that is installed in a personal computer (PC), which is an information processing apparatus, and updates firmware of an MFP, which is an image processing apparatus connected to the PC. When a user starts the update application, the PC displays an MFP with firmware to be updated as an update candidate. At this time, the update application makes a first selection in which it selects an MFP having firmware to be updated as an update candidate from among a list of MFPs capable of carrying out data communications with a printer driver module installed in the PC. The update application also makes a second selection in which it selects an MFP having firmware to be updated as an update candidate from among MFPs connected to USB ports of the PC.

Here, when for example, an MFP having firmware to be updated is capable of carrying out data communications with the printer driver module and also connected to a USB port of the PC, this MFP is selected in both of the first selection and the second selection. As a result, a problem of the same MFP being displayed as redundant update candidates arises. To address this problem, the update application does not select an MFP capable of carrying out data communications with the printer driver module as an update candidate among MFPs connected to the USB ports of the PC in the second selection. At this time, based on connection information indicating that the printer driver module and a USB port are connected together, the update application identifies an MFP capable of carrying out data communications with the printer driver module. Specifically, when an MFP is connected to a certain USB port, and there is the connection information indicating that the printer driver module and this USB port are connected together, the update application regards this MFP as an MFP capable of carrying out data communications with the printer driver module. Then, in the second selection, the update application does not select this MFP as an update candidate. Accordingly, the PC installs a virtual device module of the MFP and uses this virtual device module to carry out data communications between the PC and the MFP connected to the USB port.

The PC, which has the V4 driver, manages connection information indicating that the V4 driver and a virtual device module are connected together, but does not manage connection information indicating that the V4 driver and a USB port are connected together. For this reason, in the second selection, the update application cannot identify an MFP capable of carrying out data communications with the V4 driver among MFPs connected to the USB ports based on the connection information. Specifically, when an MFP is connected to a certain USB port, whether or not this USB port is connected to the V4 driver is unknown although the connecting information is present, and therefore, this MFP is not considered as an MFP capable of carrying out data communications with the V4 driver. As a result, when an MFP having firmware to be updated is capable of carrying out data communications with the printer driver module and also connected to a USB port, this MFP may be selected in both of the first selection and the second selection. Namely, redundant update candidates may be displayed, depending on a type of a printer driver module.

The underlying technique has been described above. Hereafter, an embodiment of the present invention will be described in detail with reference to the drawings.

FIG. 1 is a diagram schematically showing an arrangement of a communication system 100 including a PC 101 that is an information processing apparatus according to an embodiment of the present invention in which an update application module 111 is installed.

Referring to FIG. 1, the communication system 100 has the PC 101 and MFPs 102, 103, and 104 which are image processing apparatuses. The PC 101 is connected to the MFP 102 via a LAN cable 112 and also connected to the MFPs 103 and 104 via respective USB ports 208 and 203 in FIG. 2, to be described later. It should be noted that in FIG. 1, solid-line arrows indicate communications of print data for performing printing, and dotted-line arrows indicate communication of data other than the print data.

Referring to FIG. 1, the PC 101 has a software module 105 and carries out update processes for firmware of the MFPs 102 to 104 connected to the PC 101. The software module 105 has an application module 106, a V3 driver module 107, a standard spooler module 109, a status window module 110, and an update application module 111. The V3 driver module 107 has a language monitor module 108. Processes of the software module 105 are carried out by a CPU 201, to be described later, executing programs stored in a ROM 204 and an HDD 205, to be described later.

The application module 106 receives an instruction to start printing performed by the MFPs 102 and 103 capable of carrying out communications with the V3 driver module 107 and sends an instruction command, which indicates that the instruction has been received, to the V3 driver module 107. The V3 driver module 107 manages the instruction command received from the application module 106 and generates print data based on the instruction command. The language monitor module 108 controls communications with an MFP capable of carrying out communications with the V3 driver module 107 among the MFPs 102 to 104 connected to the PC 101. In the present embodiment, a Windows OS, not shown, of the PC 101 manages printer driver-related information. The printer driver-related information includes version information on a printer driver module installed in she PC 101, a driver compliant model list showing MFPs capable of carrying out communications with the printer driver module, and so forth. The following description is based on the assumption that the MFPs 102 and 103 are MFPs capable of carrying out communications with the V3 driver module 107, and the MFP 104 is an MFP incapable of carrying out communications with the V3 driver module 107. Namely, the PC 101 sends print data and others to only the MFPs 102 and 103 among the MFPs 102 to 104 using the V3 driver module 107 to control processes carried out by the MFPs 102 and 103. The standard spooler module 109 is a print spooler for the Windows OS mentioned above. The standard spooler module 109 temporarily stores print data generated by the V3 driver module 107 and outputs the stored print data to the MFPs 102 and 103 using the language monitor module 108 in an order in which the print data was stored.

The status window module 110 controls display of execution statuses of printing performed by the MFPs 102 and 103. The update application module 111 controls update processes for firmware of the MFPs 102 to 104 connected to the PC 101. The update application module 111 manages update data for firmware and an update data compliant model list showing models compliant with the update data. The update application module 111 also causes a display unit 210 in FIG. 2, to be described later, to display information on a list of MFPs as update candidates among MFPs connected to the PC 101 and carries out an update process for an MFP selected by a user. The update application module 111 carries out an update process for an MFP capable of carrying out communications with the V3 driver module 107 such as the MFPs 102 and 103 through the language monitor module 108. On the other hand, the update application module 111 carries out an update process for an MFP incapable of carrying out communications with the V3 driver module 107 such as the MFP 104 without using the language monitor module 108.

Figure 2:
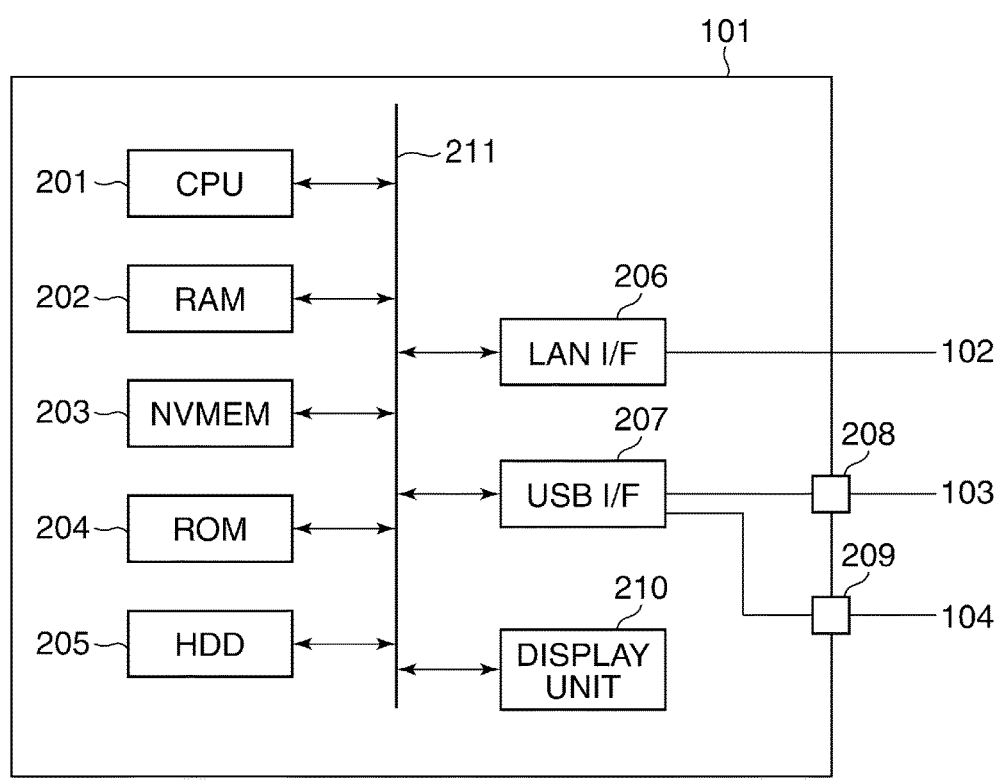
FIG. 2 is a block diagram schematically showing a hardware arrangement of the PC in FIG. 1.

FIG. 2 is a block diagram schematically showing a hardware arrangement of the PC 101 in FIG. 1.

Referring to FIG. 2, the PC 101 has a CPU 201, a RAM 202, an NVMEM (non-volatile memory) 203, a ROM 204, an HDD 205, and a LAN I/F 206. The PC 101 also has a USB I/F 207, at least one USB port, for example, two USB ports 208 and 209, and the display unit 210. The CPU 201, the RAM 202, the NVMEM 203, the ROM 204, the HDD 205, the LAN I/F 206, the USB I/F 207, and the display unit 210 are connected to one another via a system bus 211. The USB I/F 207 is connected to each of the USB ports 208 and 209.

Figure 5:
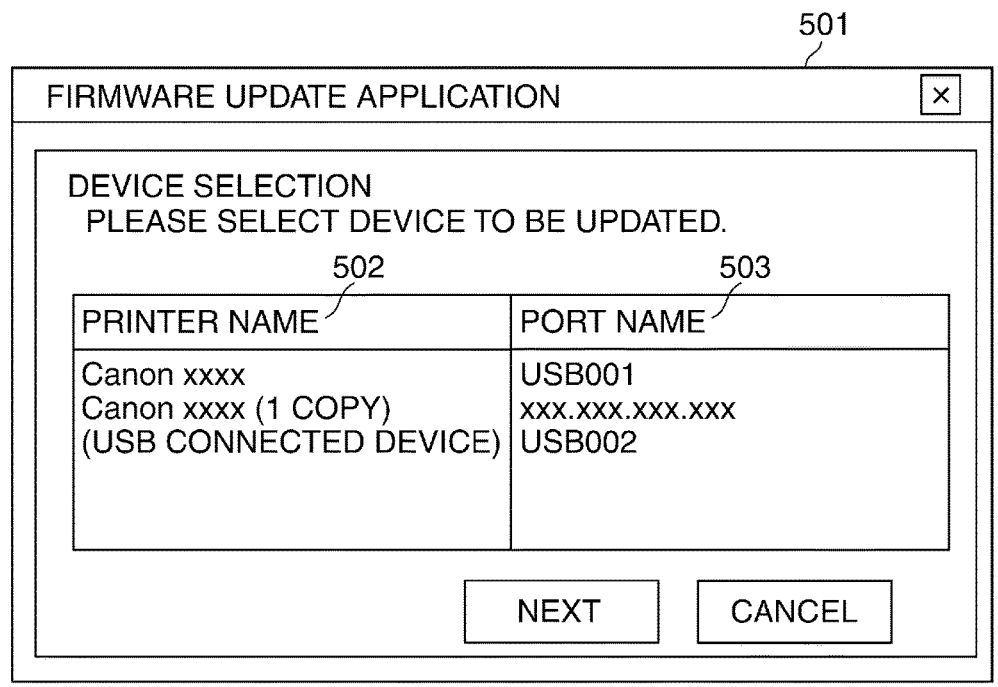
FIG. 5 is a view showing an exemplary setting screen which is displayed on a display unit in FIG. 2.

The CPU 201 centrally controls the overall PC 101, and carries oat processes of the software module 105 and others by executing programs stored in the ROM 204. The RAM 202 is used as a work area for the CPU 201 and also used as a temporary storage area for a variety of data. The NVMEM 203 is a nonvolatile memory and stores, for example, setting information. The ROM 204 is a nonvolatile memory and stores programs which are executed by the CPU 201. The HDD 205 stores a variety of data. The LAN I/F 206 carries out data communications with the MFP 102 connected thereto via the LAN cable 112. The USB I/F 207 carries out data communications with the MFPs 103 and 104 connected thereto via the USB ports 208 and 209, respectively. In the present embodiment, when the MFP 103 connected to the USB port 208 is an MFP capable of carrying out communications with the V3 driver module 107, the Windows OS manages internal connection information indicating that the V3 driver module 107 and the USB port 208 are connected together. The display unit 210 displays a setting screen for configuring various settings, and for example, under the control of the update application module 111, displays a setting screen 501 in FIG. 5, to be described later, including information on a list of MFPs which are update candidates.

Figure 3:
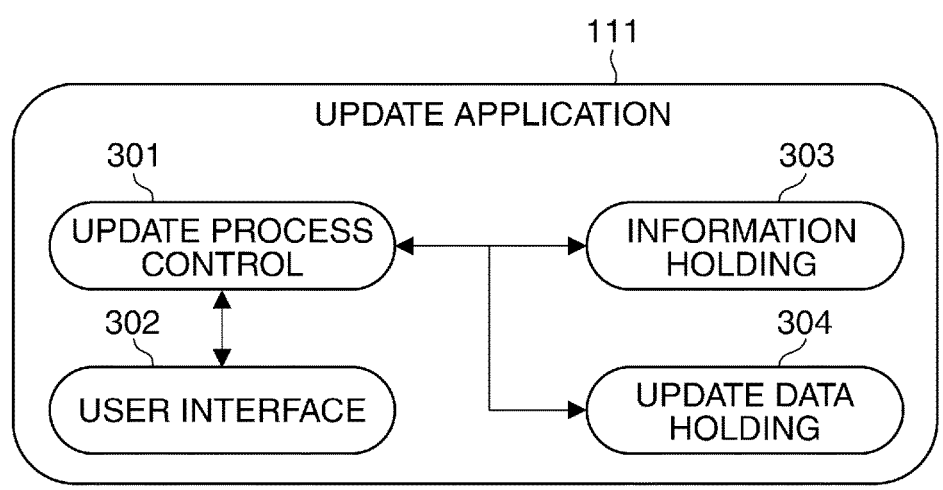
FIG. 3 is a block diagram schematically showing an arrangement of the update application module in FIG. 1.

FIG. 3 is a block diagram schematically showing an arrangement of the update application module 111 in FIG. 1.

Referring to FIG. 3, the update application module 111 has an update process control module 301, a user interface module 302, an information holding module 303, and an update data holding module 304.

The update process control module 301 controls update processes for firmware of the MFPs 102 to 104. The user interface module 302 controls display on the setting screen 501 in FIG. 5, to be described later, and receives settings input on the setting screen 501. The information holding module 303 holds an update data compliant model list showing models compliant with update data for the firmware, and the update data holding module 304 holds the update data for the firmware.

Figure 4:
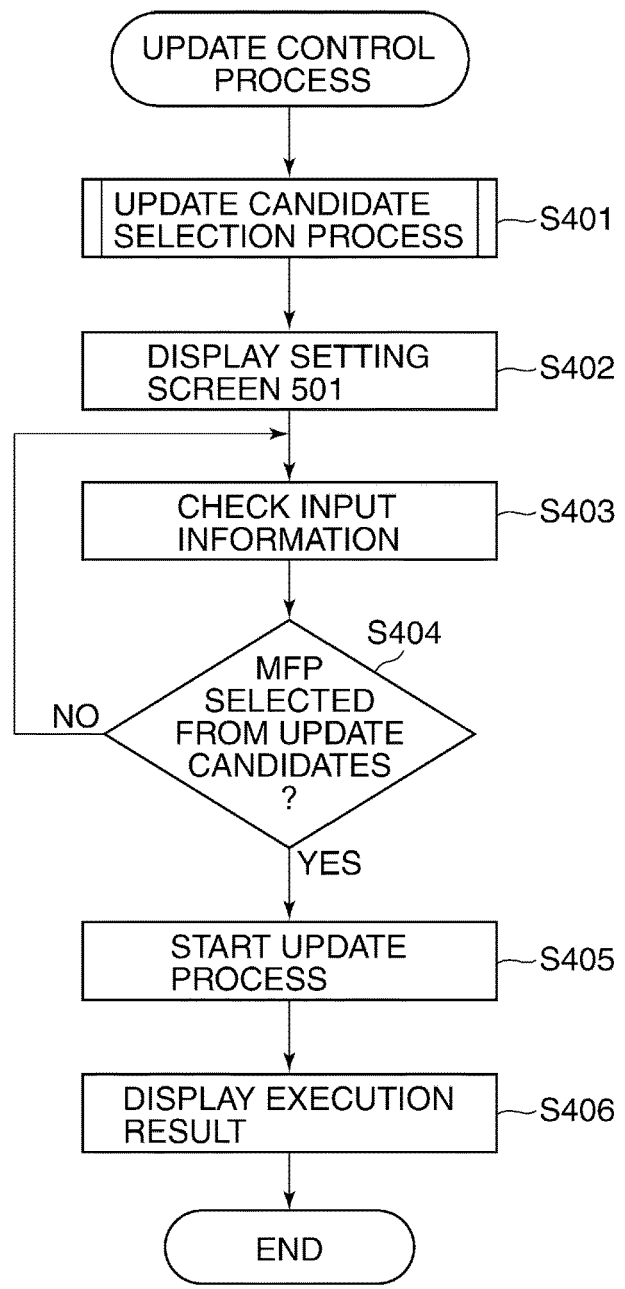
FIG. 4 is a flowchart showing the procedure of an update control process which is carried out by the PC in FIG. 1.

FIG. 4 is a flowchart showing the procedure of an update control process which is carried out by the PC 101 in FIG. 1.

The process in FIG. 4 is carried out by the CPU 201 executing a program stored in the ROM 204 or the HDD 205 and based on the assumption that an instruction to start the update application module 111 has been issued by a user.

In the process in FIG. 4, first, the CPU 201 carries out an update candidate selection process in FIG. 12, to be describe later (step S401), to select MFPs as update candidates for firmware update among MFPs connected to the PC 101. Next, the CPU 201 displays the setting screen 501 in FIG. 5, which includes information on a list of the selected MFPs, on the display unit 210 (step S402).

The setting screen 501 includes a printer name 502 and a port name 503. The printer name 502 is information indicative of selected MFPs. For example, when selected MFPs are the MFPs 102 and 103 capable of carrying out communications with the V3 driver module 107, model names of the MFPs 102 and 103 are displayed in the printer name 502. On the other hand, when a selected MFP is the MFP 104 incapable of carrying out communications with the V3 driver module 107, an indication that distinguishes the MFP 104 from MFPs capable of carrying out communications with the V3 driver 107, for example, "USB Connection Device" is displayed in the printer name 502. The port name 503 is information indicative of devices to which selected MFPs are connected. For example, when a selected MFP is the MFP 102 connected to the PC 101 via the LAN cable 112, an IP address of the MFP 102 is displayed in the port name 503. On the other hand, when selected MFPs are the MFPs 103 and 104 connected to the USB ports 208 and 209, respectively, "USB001" and "USB002" are displayed in the port name 503 as information indicative of the USB ports 208 and 209. The user selects one desired MFP from the displayed update candidates, and the PC 101 carries out an update process for the selected MFP.

Then, upon detecting that the user has configured settings on the setting screen 501, the CPU 201 checks input information that has been input by the user (step S403) and determines whether or not an MFP has been selected from the update candidates by the user (step S404).

When the CPU 201 determines in the step S404 that no MFP has been selected from the update candidates, the process returns to the step S403. On the other hand, as a result of the determination in the step S404, when an MFP has been selected from the update candidates, the CPU 201 starts an update process for the selected MFP (step S405). Specifically, when, for example, the MFP 102 has been selected from the update candidates, the CPU 201 sends the MFP 102 a starting notification indicating that an update process is to be started. After the sending of the starting notification is completed, the CPU 201 sends update data for firmware of the MFP 102 to the MFP 102. After that, the CPU 201 stands by until it receives an execution result notification indicating a completion or failure of application of the update data from the MFP 102. Upon receiving the execution result notification, the CPU 201 displays an execution result of the update process based on the received execution result notification (step S406) and ends the present process.

A description will now be given of a conventional update candidate selection process prior to description of an update candidate selection process according to the present embodiment.

Figure 6:
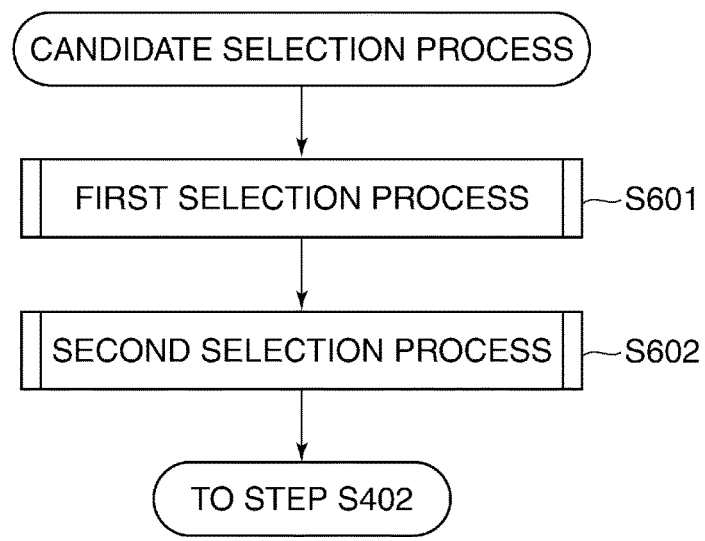
FIG. 6 is a flowchart showing the procedure of a conventional update candidate selection process.

FIG. 6 is a flowchart showing the procedure of the conventional update candidate selection process.

Referring to FIG. 6, first, the CPU 201 carries out a first selection process in FIG. 7, to be described later (step S601) and selects update candidates from MFPs indicated by the printer driver-related information. Next, the CPU 201 carries out a second selection process in FIG. 8, to be described later (step S602), selects update candidates from MFPs indicated by USB port connection information, to be described later, and carries out the process in the step S402 in FIG. 4.

Figure 7:
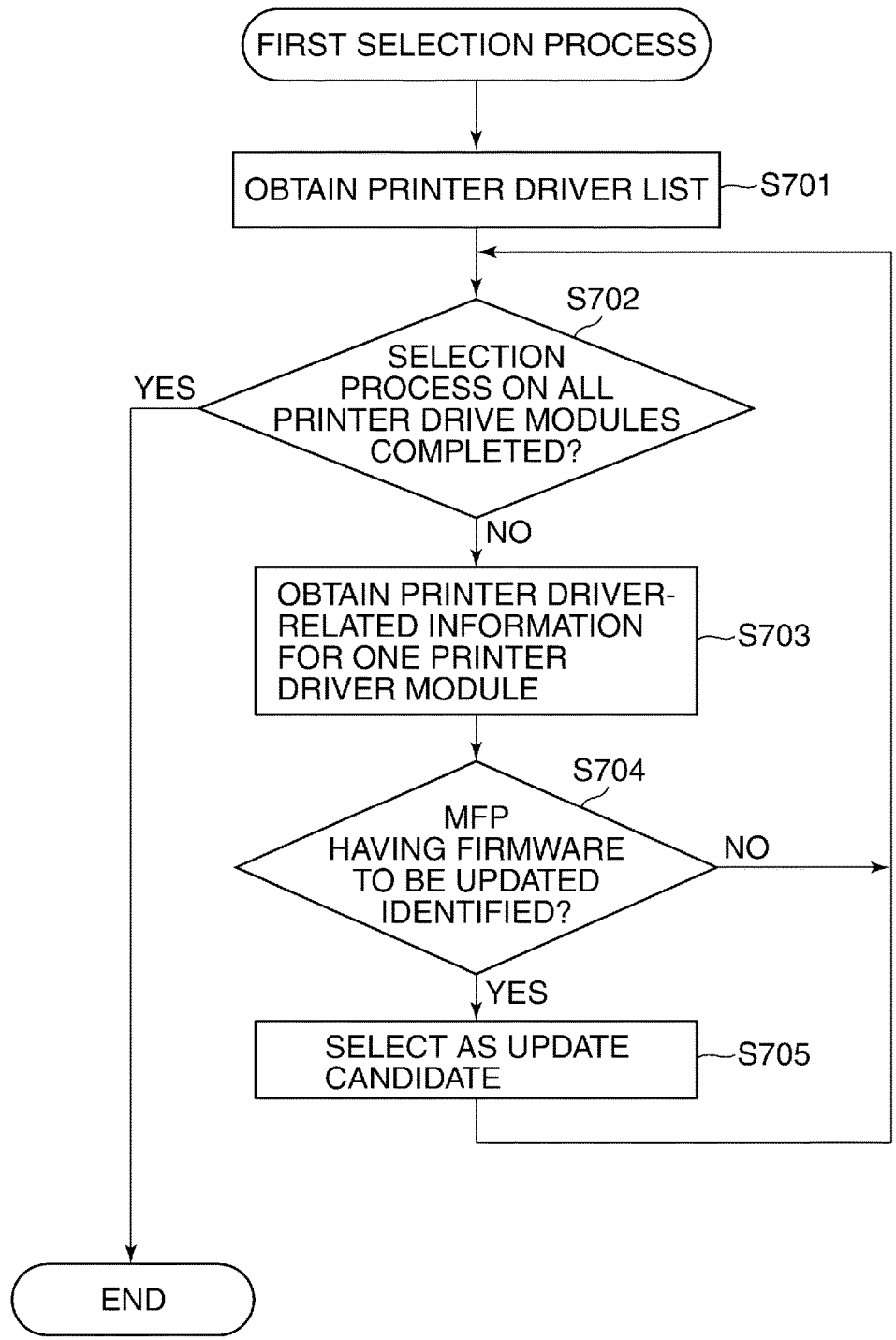
FIG. 7 is a flowchart showing the procedure of a first selection process in step S601 in FIG. 6.

FIG. 7 is a flowchart showing the procedure of the first selection process in the step S601 in FIG. 6.

Referring to FIG. 7, first, the CPU 201 inquires of the Windows OS to obtain a printer driver list showing printer driver modules that have already been installed (step S701). Next, the CPU 201 determines whether or not the selection process has been completed for all the printer driver modules included in the obtained printer driver list (step S702).

As a result of the determination in the step S702, when the selection process has not been completed, for any one of the printer driver modules included in the obtained printer driver list, the CPU 201 selects one printer driver module, for which the selection process has not been completed, from the printer driver list. The CPU 201 inquires of the Windows OS to obtain printer driver-related information on the one printer driver module (step S703). The printer driver-related information includes version information on the printer driver module, a driver compliant model list showing names of models capable of carrying out communications with the printer driver module, and so forth. Then, the CPU 201 determines whether or not an MFP having firmware to be updated has been identified based on the printer driver-related information (step S704). Specifically, the CPU 201 compares the driver compliant model list included in the printer driver-related information with an update data compliant model list held in the information holding module 303. The CPU 201 identifies an MFP which corresponds to or matches an MFP indicated by the update data compliant model list among MFPs indicated by the driver compliant model list as an MFP having firmware to be updated.

As a result of the determination in the step S704, when an MFP having firmware to be updated has been identified based on the printer driver-related information, the CPU 201 selects this MFP as an update candidate (step S705), followed by the process returning to the step S702. On the other hand, as a result of the determination in the step S704, when no MFP having firmware to be updated has been identified based on the printer driver-related information, the process returns to the step S702. Namely, in the process in FIG. 7, the selection process for MFPs capable of carrying out communications with the printer driver modules of the PC 101 is carried out based on printer driver-related information.

As a result of the determination in the step S702, when the selection process has been completed for all the printer driver modules included in the obtained printer driver list, the CPU 201 ends the present process.

Figure 8:
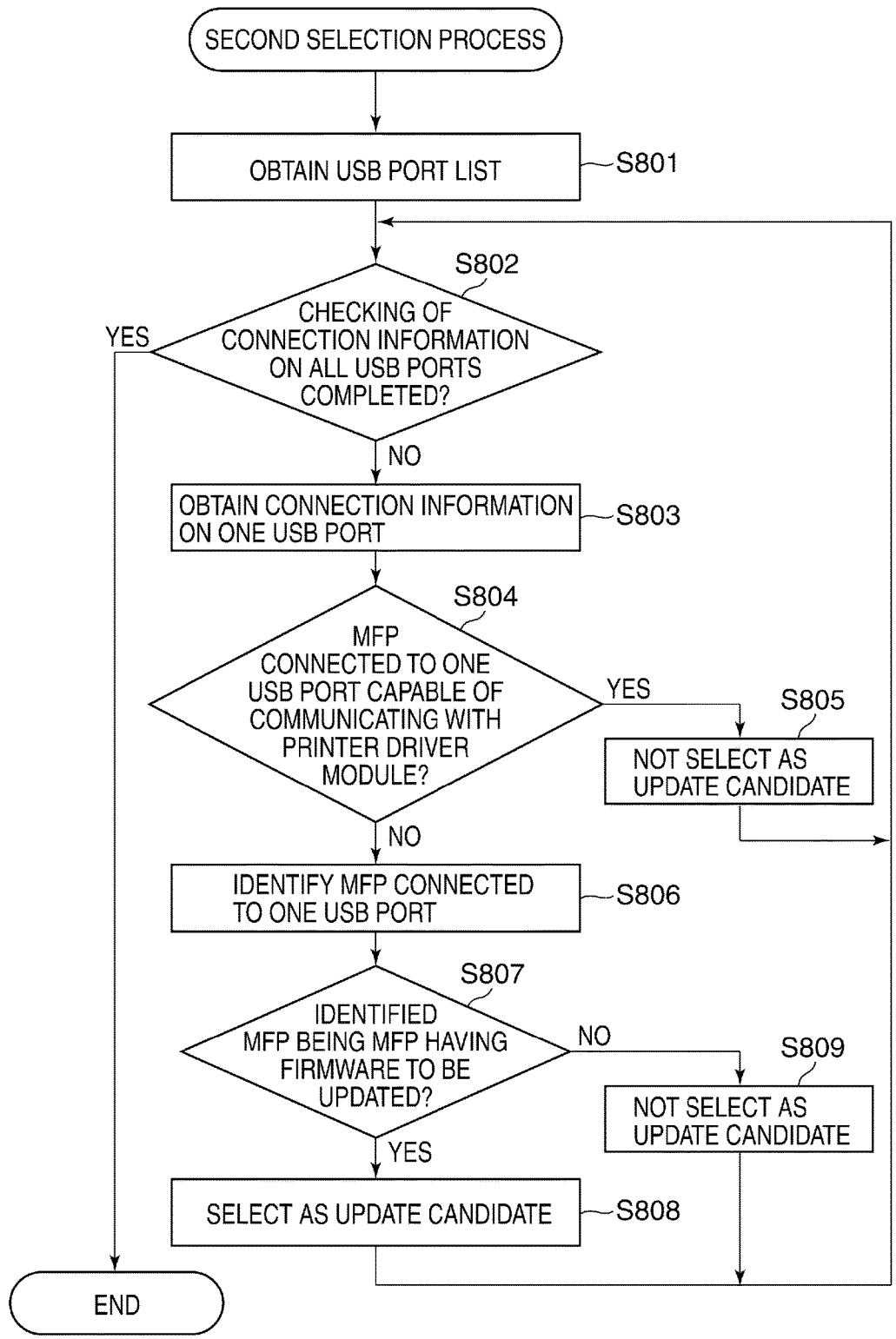
FIG. 8 is a flowchart showing the procedure of a second selection process in step S602 in FIG. 6.

FIG. 8 is a flowchart showing the procedure or the second selection process in the step S602 in FIG. 6.

Referring to FIG. 8, first, the CPU 201 obtains a USB port list showing USB ports provided in the PC 101 such as the USB ports 208 and 209 (step S801). Next, the CPU 201 determines whether or not checking of connection information on all the USB ports included in the obtained USB port list (step S802). Connection information on a USB port includes internal connection information indicating that the USB port and a printer driver module, for example, the V3 driver module 107 are connected together, and external connection information indicating an MFP connected to the USB port.

As a result of the determination in the step S802, when checking of connection information on all the USB ports included in the obtained USB port list has been completed, the CPU 201 ends the present process. On the other hand, as a result of the determination in the step S802, when checking of connection information on any one of the USB ports included in the obtained USB port list has not been completed, the CPU 201 selects the one USB port, for which checking of connection information has not been completed, from the obtained USB port list. The CPU 201 then obtains connection information on the selected one USB port (step S803). After that, the CPU 201 determines whether or not an MFP connected to the one USB port is capable of carrying out communications with the printer driver module (step S804). Here, the selection process for MFPs capable of communicating with printer driver modules has already been carried out in the process in FIG. 7. For example, when an MFP having firmware to be updated is capable of carrying out communications with the printer driver module and connected to the one USB port, this MFP is selected as an update candidate in both of the step S705 and step S808, to be described later. As a result, a problem of the same MFP being displayed as redundant update candidates arises. To address this problem, in the process in FIG. 8, the determination process in the step S804 is carried out prior to the step S808, to be described later, so as not to select, as an update candidate, an MFP capable of carrying out communications with the printer driver module when it is connected to the one USB port. In the step S804, for example, when internal connection information indicating that the one USB port and the printer driver module are connected together is obtained from the Windows OS, the CPU 201 determines that the MFP connected to the one USB port is capable of carrying out communications with the printer driver module. On the other hand, when internal connection information indicating that the one USB port and the printer driver module are connected together is not obtained from the Windows OS, the CPU 201 determines that the MFP connected to the one USB port is incapable of carrying out communications with the printer driver module.

As a result of the determination in the step S804, when the MFP connected to the one USB port is capable of carrying out communications with the printer driver module, the CPU 201 does not select this MFP connected to the one USB port as an update candidate (step S80S), followed by the process returning to the step S802.

As a result of the determination in the step S804, when the MFP connected to the one USB port is incapable of carrying out communications with the printer driver module, the CPU 201 identifies the MFP connected to the one USB port based on connection information on the one USB port (step S806). Then, the CPU 201 determines whether or not the identified MFP is an MFP having firmware to be updated (step S807). Specifically, when the MFP connected to the one USB port corresponds to or matches an MFP indicated by the update data compliant model list, the CPU 201 determines that the MFP connected to the one USB port is an MFP having firmware to be updated. On the other hand, when the MFP connected to the one USB port does not correspond to or match an MFP indicated by the update data compliant model list, the CPU 201 determines that the MFP connected to the one USB port is an MFP that does not have the firmware to be updated.

As a result of the determination in the step S807, when the MFP connected to the one USB port is an MFP having firmware to be updated, the CPU 201 selects this MFP as an update candidate (step S808), followed by the process returning to the step S802. On the other hand, when the MFP connected to the one USB port is an MFP that does not have the firmware to be updated, the CPU 201 does not select this MFP as an update candidate (step S809). Namely, in the process in FIG. 8, a selection process is carried out for an MFP connected to a USB port based on the USB port connection information. After that, the process returns to the step S802.

Figure 9:
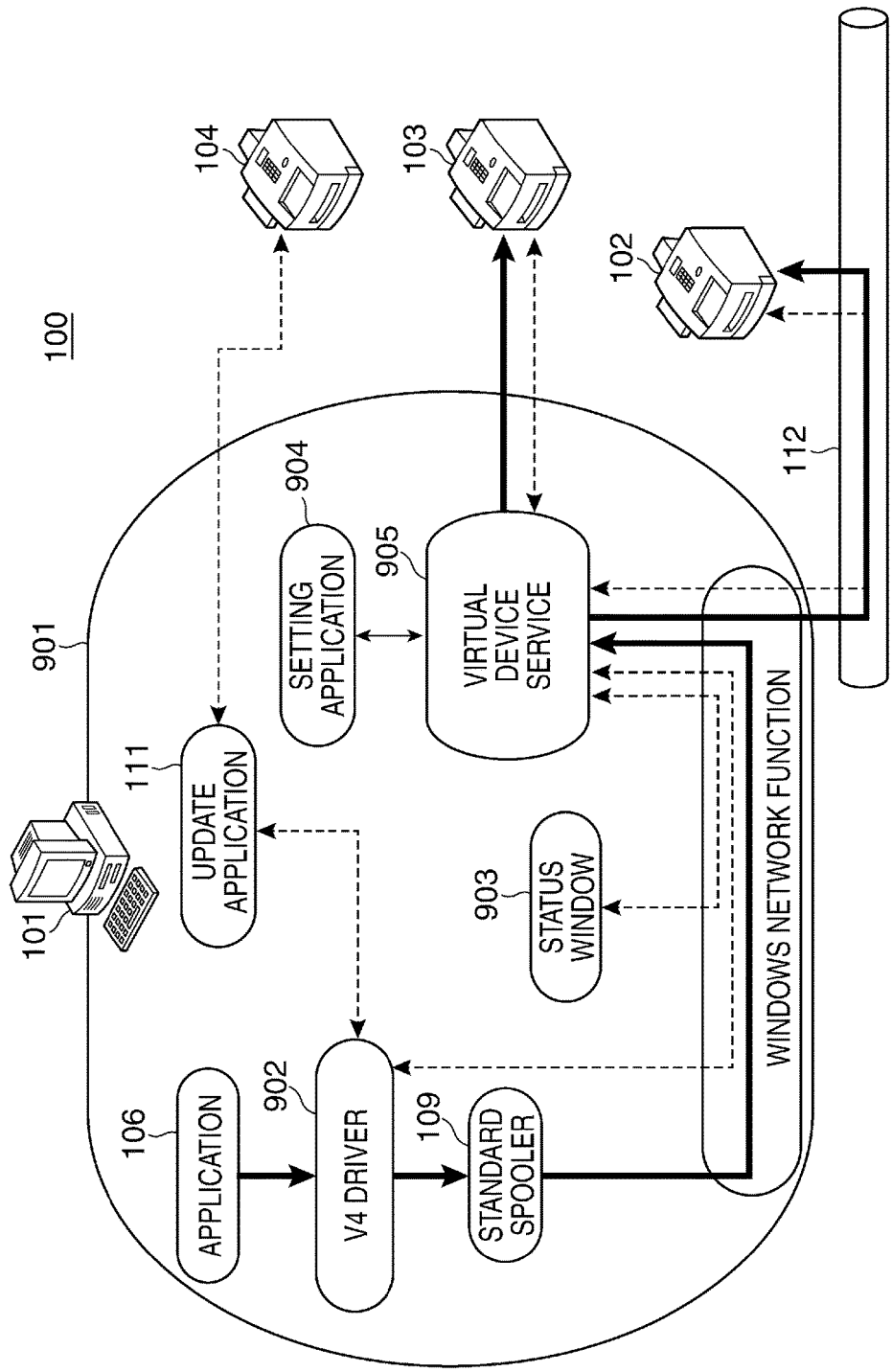
FIG. 9 is a view useful in explaining a software module including a V4 driver module installed in the PC in FIG. 1.

A description will now be given of a case where a software module 901 including a V4 driver module 902 in FIG. 9 is installed in the PC 101.

FIG. 9 is a view useful in explaining the software module 901 including the V4 driver module 902 installed in the PC 101 in FIG. 1.

The software module 901 is basically the same as the software module 105 described above in terms of construction and operation and differs from the software module 105 in terms of a printer driver module version. Therefore, features of the construction and operation that are the same as those of the software module 105 will thus not be described, only features of the construction and operation different from those of the software module 105 being described below.

Referring to FIG. 9, the PC 101 has the software module 901. The software module 901 has the V4 driver module 902, a status window module 903, a setting application module 904, and a virtual device service module 905 as well as the application module 106, the standard spooler module 109, and the update application module 111 in FIG. 1.

The V4 driver module 902 manages an instruction command received from the application module 106 and generates print data based on the instruction command. In the present embodiment, it is possible to obtain version information on a printer driver module by inquiring of the Windows OS, not shown. The V4 driver module 902 carries out data communications with the MFPs 102 and 103, which are capable of carrying out communications with the V4 driver module 902, via the virtual device service module 905. The status window module 903 has an RPC (remote procedure call) client function. The status window module 903 carries out communications with the virtual device service module 905 using the RPC client function to control display of execution statuses of printing performed by the MFPs 102 and 103. The setting application module 904 manages information about a variety of settings on the virtual device service module 905. The virtual device service module 905 is an emulator which physically behaves just like the MFPs 102 and 103 for the V4 driver module 902, the standard spooler module 109, and the status window module 903. The virtual device service module 905 carries out data communications with the V4 driver module 902, the standard spooler module 109, and the status window module 903 using a Windows network function.

Figure 10:
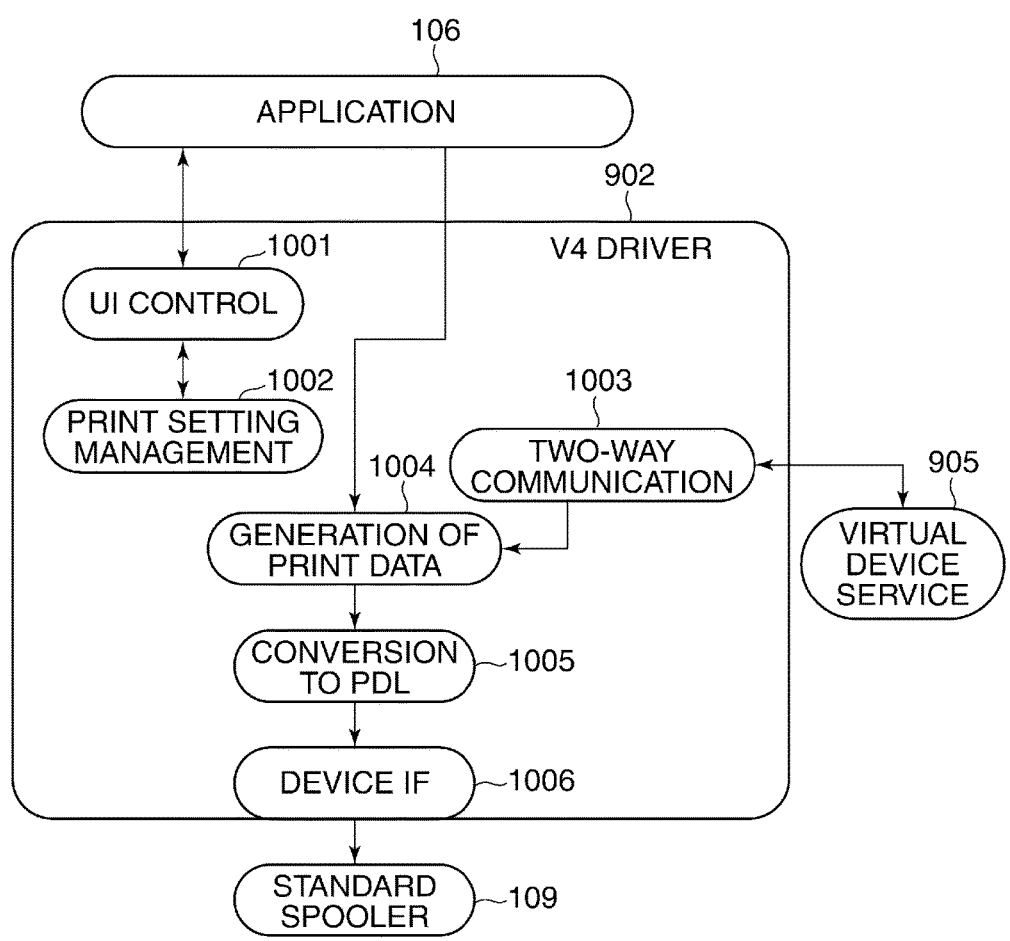
FIG. 10 is a block diagram schematically showing an arrangement of the V4 driver module in FIG. 9.

FIG. 10 is a block diagram schematically showing an arrangement of the V4 driver module 902 in FIG. 9.

Referring to FIG. 10, the V4 driver module 902 has a UI control module 1001, a print setting management module 1002, and a two-way communication module 1003. The V4 driver module 902 also has a print data generating module 1004, a PDL (page-description language) converting module 1005, and a device I/F module 1006. Processes of the V4 driver module 902 are carried out by the CPU 201 executing programs stored in the ROM 204.

The UI control module 1001 controls display of a print setting screen on which image data to be printed, print setting information, and so forth are set. The print setting management module 1002 manages combinations of setting items that are allowed to be set on the print setting screen. The two-way communication module 1003 has the RPC client function and carries out data communications with the virtual device service module 905. The print data generating module 1004 performs rendering based on an instruction command to generate intermediate data in an XPS (XML Paper Specification) format. The PDL converting module 1005 converts the intermediate data in the XPS format to print data in a PDL format readable by the MFPs 102 and 103. The device I/F module 1006 sends the print data in the PDL format obtained as a result of the conversion to the standard spooler module 109.

Figure 11:
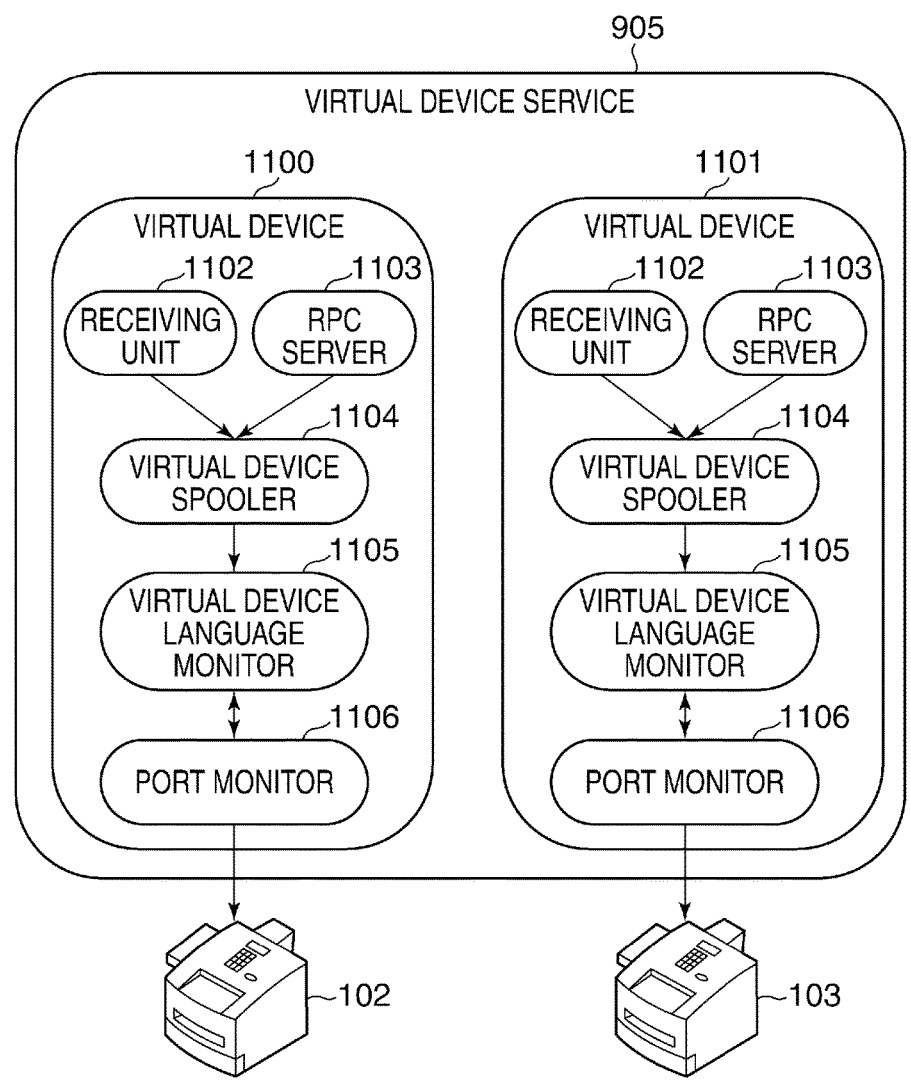
FIG. 11 is a block diagram schematically showing an arrangement of a virtual device service module in FIG.

FIG. 11 is a block diagram schematically showing an arrangement of the virtual device service module 905 in FIG. 9.

Referring to FIG. 11, the virtual device service module 905 has a plurality of virtual device modules, which are provided for respective MFPs. The virtual device service module 905 has a function of accepting registration and deletion of virtual devices, and upon accepting registration of a new virtual device, the virtual device service module 905 associates a reception port number of the PC 101 with the new virtual device. The Windows OS manages internal connection information, which indicates that the V4 driver module 902 and the virtual device service module 902 are connected together, as information on the association of the reception port number with the new virtual device. When the virtual device service module 905 has a plurality of virtual devices, the PC 101 associates the virtual devices with respective reception port numbers. In the present embodiment, it is assumed that, for example, the virtual device service module 905 has two virtual device modules 1100 and 1101 which correspond to the MFPs 102 and 103, respectively. Specifically, the virtual device module 1100 corresponds to the MFP 102, and the virtual device module 1101 corresponds to the MFP 103. Processes of the virtual device service module 905 are carried out by the CPU 201 executing programs stored in the ROM 204. It should be noted that in the present embodiment, the virtual device modules 1100 and 1101 have the same arrangement, and hence in the following description, the virtual device module 1100 is used as an example.

The virtual device module 1100 has a receiving module 1102, an RPC server module 1103, a virtual device spooler module 1104, a virtual device language monitor module 1105, and a port monitor module 1106.

The receiving module 1102 receives print data, which is to be sent to the MFP 102, from the standard spooler module 109 via a reception port number associated with the virtual device modules 1100. The RPC server module 1103 carries out data communications with modules having RPC function such as the status window module 903 and the two-way communication module 1003. The virtual device spooler module 1104 stores the print data received by the receiving module 1102. The virtual device spooler module 1104 also generates print data identification information on the stored print data. The print data identification information includes a device name of the PC 101, a name of a user who has issued an instruction to perform printing, a data name of mage data included in print instruction data, and so forth. The virtual device language monitor module 1105 controls data communications in the virtual device modules 1100. For example, the virtual device language monitor module 1105 controls transmission of print data to the MFP 102 and controls reception of print status information on the MFP 102 from the MFP 102. The virtual device language monitor module 1105 also provides control to send print status information on the MFP 102 to the status window module 110. The port monitor module 1106 carries out data communications with the MFP 102 connected to the USB port 208.

In the virtual device module 1101 as well, the receiving module 1102 similarly receives print data, which is to be sent to the MFP 103, from the standard spooler module 109 via a reception port number associated with the virtual device modules 1101. The virtual device module 1101 temporarily stores the received data using the virtual device spooler module 1104 and sends the stored print data from the port monitor module 1106 to the MFP 103. The virtual device module 1101 also receives, for example, print status information on the MFP 103 from the MFP 103 using the port monitor module 1106.

Here, in the PC 101 with the V3 driver module 107 installed therein, when an MFP having firmware to be updated is the MFP 103 capable of carrying out communications with the printer driver module and also connected to the USB port 208, the MFP 103 is not selected as redundant update candidates in the determination process in the step S804.

On the other hand, in the PC 101 with the V4 driver module 902 installed therein, internal connection information indicating that the V4 driver module 902 and the USB port 208 are connected together is not managed although internal connection information indicating that the V4 driver module 902 and the virtual device service module 905 are connected together is managed. Thus, in the determination process in the step S804, if cannot be determined that the MFP 103 connected to the USB port 208 is capable of carrying out communications with the V4 driver module 902 based on the internal connection information. Specifically, when the MFP 103 is connected to the USB port 208, whether or not the USB port 208 is connected to the V4 driver module 902 is unknown even if the internal connection information is present. For this reason, if cannot be determined that the MFP 103 is capable of carrying out communications with the V4 driver module 902. As a result, when an MFP having firmware to be updated is the MFP 103, the MFP 103 may be selected as an update candidate in both of the step S705 and the step S808. Namely, a problem of the same MFP being displayed as redundant update candidates arises, depending on a type of a printer driver module.

To address this problem, in the present embodiment, the way of selecting an update candidate is changed based on whether or not the V4 driver module 902 is installed in the PC 101.

Figure 12:
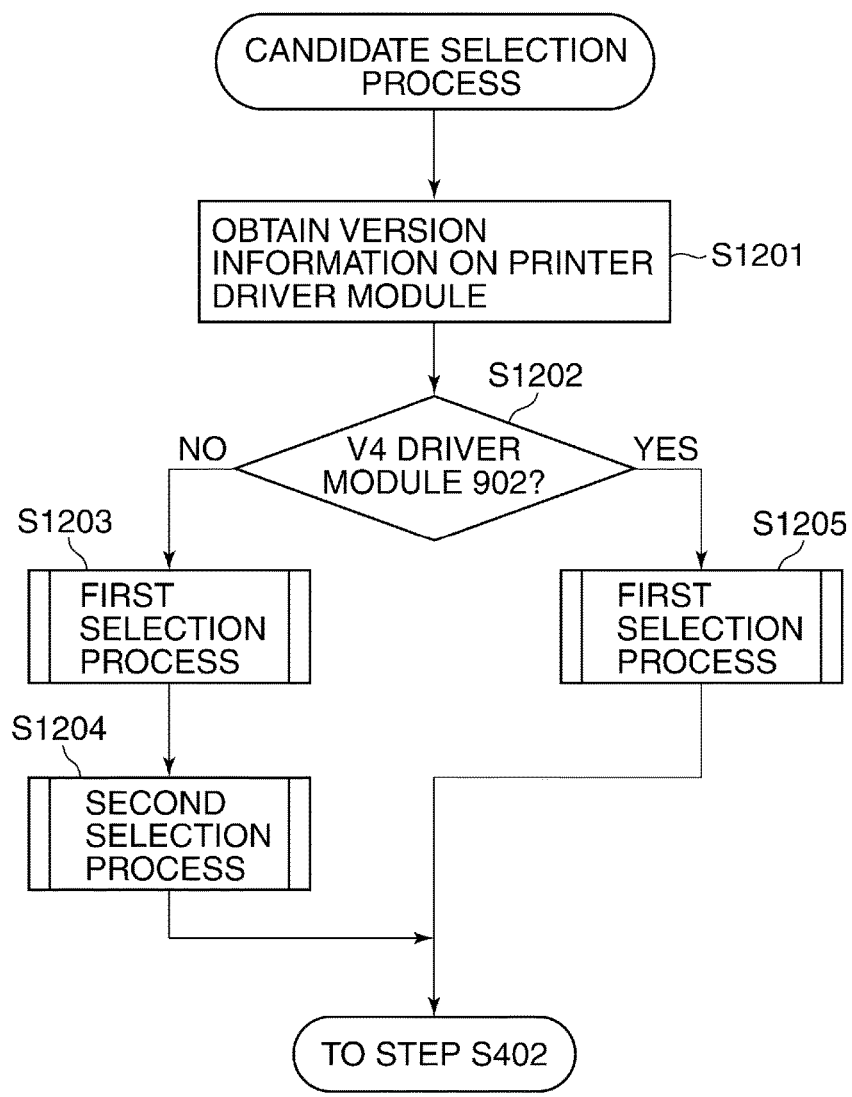
FIG. 12 is a flowchart showing the procedure of an update candidate selection process according to the present embodiment.
Figure 13:
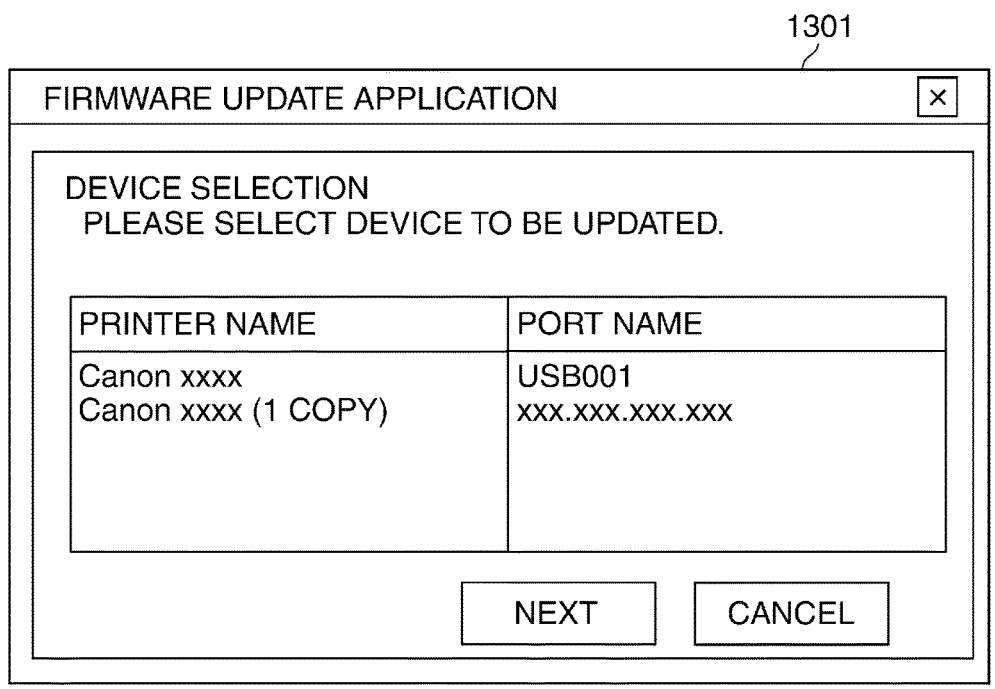
FIG. 13 is a view showing an exemplary setting screen which is displayed on the display unit in FIG. 2.

FIG. 12 is a flowchart showing the procedure of an update candidate selection process according to the present embodiment.

Referring to FIG. 12, first, the CPU 201 inquires of the Windows OS to obtain printer driver-related information on a printer driver module for an MFP having firmware to be updated among printer driver modules of the PC 101. Next, the CPU 201 obtains version information on the printer driver module from the obtained printer driver-related information (step S1201). The CPU 201 then determines whether or not the obtained version information indicates the version 4, that is, whether or not the printer driver module for the MFP having firmware to be updated is the V4 driver module 902 (step S1202).

As a result, of the determination in the step S1202, when the printer driver module for the MFP having firmware to be updated is not the V4 driver module 902, the CPU 201 carries out the first selection process in FIG. 7 (step S1203). The CPU 201 then carries out the second selection process in FIG. 8 (step S1204). Namely, in the present embodiment, when a printer driver module for the MFP having firmware to be updated is any but the V4 driver module 902, an update candidate is selected based on the printer driver-related, information and the USB port connection information. After that, the CPU 201 ends the present process.

As a result of the determination in the step S1202, when the printer driver module for the MFP having firmware to be updated is the V4 driver module 902, the CPU 201 carries out the first selection process in FIG. 7 (step S1205). Namely, in the present embodiment, when a printer driver module for an MFP having firmware to be updated is the V4 driver module 902, an update candidate is selected based on only the printer driver-related information. After that, the CPU 201 carries out the process in the step S402 in FIG. 4. In the step S402, the setting screen 1301 including only selected MFPs among MFPs indicated by the printer driver-related information and the USB port connection information is displayed on the display unit 210.

According to the process in FIG. 12 described above, when a printer driver module is the V4 driver module 902, update candidates are selected based on only the printer driver-related information. Here, when a printer driver module is the V4 driver module 902, MFPs indicated by printer driver-related information and USB port connection information include the same MFP, this MFP may be selected as redundant update candidates. To cope with this, in the present embodiment, when a printer driver module is the V4 driver module 902, update candidates are selected based on only the printer driver-related information. As a result, when a printer driver module is the V4 driver module 902, the same MFP is prevented from being displayed as redundant update candidates. Moreover, when a printer driver module is any but the V4 driver module 902, update candidates are selected based on the printer driver-related information and the USB port connection information. Here, when a printer driver module is any but the V4 driver module 902, even if the same MFP is included in the printer driver-related information and the USB port connection information, this MFP is not displayed as redundant update candidates. Namely, even if update candidates are selected based on the printer driver-related information and the USB port connection information, redundant update candidates are not displayed. As a result, redundant update candidates are prevented from being displayed irrespective of a type of a printer driver module.

Moreover, in the process in FIG. 12 described above, only update candidates selected among MFPs indicated by the printer driver-related information and the USB port connection information are displayed on the display unit 210, and this prevents a user from selecting an inappropriate MFP as an object to be updated.

Although the present invention has been described by way of the embodiment, the present invention is not limited to the embodiment described above.

For example, in the step S804, whether or not an MFP connected to a USB port of the PC 101 is capable of carrying out communications with a printer driver module of the PC 101 may be determined based on the printer driver-related information and the USB port connection information. Specifically, it is determined that the MFP connected to the USB port is capable of carrying out communications with the printer driver module when the MFP indicated by the USB port connection information corresponds to or matches an MFP indicated by a driver compliant model list included in the printer driver-related information. On the other hand, it is determined that the MFP connected to the USB port is incapable of carrying out communications with the printer driver module when the MFP indicated by the USB port connection information does not match or correspond to an MFP indicated by the driver compliant model list included in the printer driver-related information. As a result, even in a case where internal connection information indicating that the V4 drier module 902 and USB ports are connected together cannot be managed as in the case where the V4 driver module 902 is installed in the PC 101, an MFP capable of carrying out communications with the V4 drier module 902 is easily identified among MFPs connected to the USB ports.

Furthermore, the update application and the update method according to the present embodiment prevent redundant update candidates from being displayed irrespective of a type of a printer driver module.

OTHER EMBODIMENTS

Embodiment(s) of the present can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described, embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-095439, filed May 11, 2016 which is hereby incorporated by reference herein in its entirety.

What is claimed is:

1. An information processing apparatus that has a device driver and a local communication port, and executes an update application that updates firmware of a first image processing apparatus configured to carry out communications via the local communication port, and firmware of a second image processing apparatus configured to carry out communications with the device driver, the information processing apparatus comprising:
a processor configured to implement instructions stored in a memory and execute a plurality of tasks, including:
a first obtaining task that obtains first information indicating the second image processing apparatus configured to carry out communications with the device driver;
a second obtaining task that obtains second information indicating the first image processing apparatus connected to the local communication port; and
a determination task that determines at least one update candidate:
in a case where the device driver of the information processing apparatus is a V3 printer driver, using the first information and the second information; and
in a case where the device driver of the information processing apparatus is a V4 printer driver, using the first information without using the second information.

2. The information processing apparatus according to claim 1, the plurality of tasks include a display control task that controls a display device to display the at least one update candidate using the first information and the second information.

3. The information processing apparatus according to claim 1, the local communication port is a USB (Universal Serial Bus) communication port.

4. The information processing apparatus according to claim 2, the plurality of tasks include a selection task that, based on information input by a user on a screen of the display device on which the at least one update candidate is displayed, selects one of the at least one update.

5. The information processing apparatus according to claim 1, wherein the first information is information on a printer driver.

6. The information processing apparatus according to claim 1, wherein the first image processing apparatus includes no installed printer driver.

7. The information processing apparatus according to claim 1, wherein the second information is information not obtained by the first obtaining task.

8. The information processing apparatus according to claim 1, wherein, in the case where the device driver of the information processing apparatus is the V4 printer driver, the determination task determines the at least one update candidate using the first information without obtaining the second information.

9. A control method for an information processing apparatus that has a device driver and a local communication port, and executes an update application that updates firmware of a first image processing apparatus configured to carry out communications via the local communication port, and firmware of a second image processing apparatus configured to carry out communications with the device driver, the control method executable by a processor to execute the control method comprising the steps of:
obtaining first information indicating the second image processing apparatus configured to carry out communications with the device driver;
obtaining second information indicating the first image processing apparatus connected to the local communication port; and
determining at least one update candidate:
in a case where the device driver of the information processing apparatus is a V3 printer driver, using the first information and the second information; and
in a case where the device driver of the information processing apparatus is a V4 printer driver, using the first information without using the second information.

10. The method according to claim 9, further comprising the step of controlling a display device to display the at least one update using the first information and the second information.

11. The method according to claim 9, the local communication port is a USB (Universal Serial Bus) communication port.

12. The method according to claim 10, further comprising the step of selecting, based on information input by a user on the screen of the display device on which the at least one update candidate is displayed, one of the at least one update candidate.

13. The method according to claim 9, wherein the first information is information on a printer driver.

14. The method according to claim 9, wherein the first image processing apparatus includes no installed printer driver.

15. The method according to claim 9, wherein the second information is information not obtained by the obtaining of the first information.

16. The method according to claim 9, wherein, in the case where the device driver of the information processing apparatus is the V4 printer driver, the determining of the at least one update candidate determines the at least one update candidate using the first information without obtaining the second information.

17. A non-transitory computer-readable storage medium storing a program executable by a processor to execute a method for an information processing apparatus that has a device driver and a local communication port, and executes an update application that updates firmware of a first image processing apparatus configured to carry out communications via the local communication port, and firmware of a second image processing apparatus configured to carry out communications with the device driver, the method comprising the steps of:
obtaining first information indicating the second image processing apparatus configured to carry out communications with the device driver;

obtaining second information indicating the first image processing apparatus connected to the local communication port; and determining at least one update candidate:
- in a case where the device driver of the information processing apparatus is a V3 printer driver, using the first information and the second information; and
- in a case where the device driver of the information processing apparatus is a V4 printer driver, using the first information without using the second information.

* * * * *